(No Model.)

C. E. VAN NORMAN.
SHOE LACING HOOK.

No. 514,395. Patented Feb. 6, 1894.

Witnesses.
Lauritz N. Möller
Alice A. Perkins

Inventor.
Charles E. Van Norman
by Alban Andrew
his atty.

UNITED STATES PATENT OFFICE.

CHARLES E. VAN NORMAN, OF SPRINGFIELD, MASSACHUSETTS.

SHOE-LACING HOOK.

SPECIFICATION forming part of Letters Patent No. 514,395, dated February 6, 1894.

Application filed March 15, 1893. Serial No. 466,049. (No model.)

*To all whom it may concern:*

Be it known that I, CHARLES E. VAN NORMAN, a citizen of the United States, and a resident of Springfield, in the county of Hampden and State of Massachusetts, have invented new and useful Improvements in Shoe-Lacing Hooks, of which the following, taken in connection with the accompanying drawings, is a specification.

This invention has for its object to provide a new and improved shoe-lacing hook, comprising a metallic body or shell, and a molded composition head.

The object of my invention is accomplished in the manner and by the means hereinafter described and claimed, reference being made to the accompanying drawings, in which—

Figure 1:
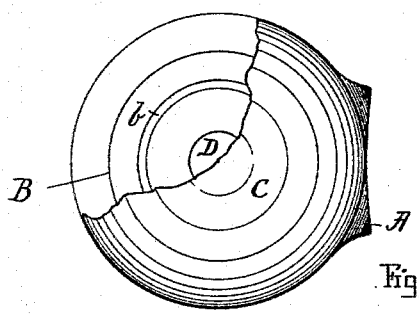
Figure 2:
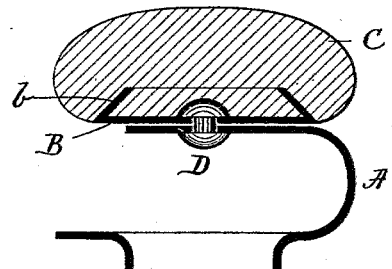
Figure 3:
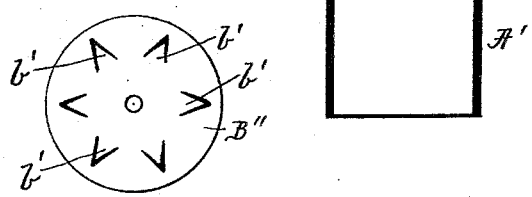
Figure 4:

Figure 1 is a broken top plan view of a lacing hook constructed in accordance with my invention. Fig. 2 is a central vertical sectional view of the same. Fig. 3 is a plan view, showing a slightly modified form of inclined projecting lip; and Fig. 4 is a sectional view of the same.

In order to enable those skilled in the art to make and use my invention, I will now describe the same in detail, referring to the drawings, wherein—

The letter A' indicates a tubular shank or eyelet, the upper edge of which is formed integral with the hook A, the free end portion of which overhangs the tubular shank or eyelet. On the top portion of the overhanging part of the hook is arranged a disk B having its rim or margin bent upwardly and inwardly to form an inclined inwardly projecting annular lip $b$, which is embedded in the molded composition head C, as clearly illustrated in Fig. 2. The inclined or inwardly projecting annular lip $b$ is embedded in the composition head after the disk or plate B is attached to the overhanging part of the hook A; and to accomplish this the disk or plate B is provided with a central orifice adapted to register with an orifice in the overhanging part of the hook, so that a rivet D may be passed through the two orifices, and then upset to connect the disk or plate and the overhanging part of the hook together, after which the composition head C is applied, so that the lip $b$ is embedded therein.

In Figs. 1 and 2 the inclined inwardly projecting lip $b$ is annular, but it may be constructed according to the modification Figs. 3 and 4, in which the disk or plate B″ is formed integral with a series of lips $b'$ which stand at an angle to the disk or plate, and are embedded in the composition head C after the disk or plate is riveted to the overhanging part of the hook, as hereinbefore explained with reference to Figs. 1 and 2.

The invention provides a novel, simple, efficient, and very desirable lacing hook, which is particularly designed for boots and shoes, but is useful for other purposes.

Having thus described my invention, what I claim is—

1. A lacing device, consisting of a tubular shank formed with a hook which overhangs the shank, a metallic disk located above the overhanging part of the hook and formed with an inclined flange, a separate rivet passing through orifices in the flanged disk and overhanging part of the hook, and a composition head in which the annular flange is embedded after the disk is riveted to the hook, substantially as described.

2. A lacing device, consisting of a tubular shank formed with a hook which overhangs the shank, a metallic disk located above the overhanging part of the hook and formed with an inclined inwardly projecting annular flange, a separate rivet passing through orifices in the annularly flanged disk and the overhanging part of the hook, and a composition head in which the annular flange is embedded after the disk is riveted to the overhanging part of the hook, substantially as described.

In testimony whereof I have signed my name to this specification, in the presence of two subscribing witnesses, on this 13th day of February, A. D. 1893.

CHARLES E. VAN NORMAN.

Witnesses:
ALBAN ANDRÉN,
ALICE A. PERKINS.